(12) United States Patent
Koonen

(10) Patent No.: US 11,923,900 B2
(45) Date of Patent: Mar. 5, 2024

(54) OPTICAL WIRELESS COMMUNICATION RECEIVER WITH LARGE PHOTODETECTOR SURFACE AREA, LARGE FIELD OF VIEW AND HIGH BANDWIDTH

(71) Applicant: TECHNISCHE UNIVERSITEIT EINDHOVEN, Eindhoven (NL)

(72) Inventor: Antonius Marcellus Jozef Koonen, Eindhoven (NL)

(73) Assignee: TECHNISCHE UNIVERSITEIT EINDHOVEN, Eindhoven (NL)

( * ) Notice: Subject to any disclaimer, the term of this patent is extended or adjusted under 35 U.S.C. 154(b) by 0 days.

(21) Appl. No.: 17/773,457

(22) PCT Filed: Oct. 30, 2020

(86) PCT No.: PCT/EP2020/080594
§ 371 (c)(1),
(2) Date: Apr. 29, 2022

(87) PCT Pub. No.: WO2021/084108
PCT Pub. Date: May 6, 2021

(65) Prior Publication Data
US 2022/0393759 A1    Dec. 8, 2022

Related U.S. Application Data

(60) Provisional application No. 62/928,625, filed on Oct. 31, 2019.

(51) Int. Cl.
*H04B 10/00* (2013.01)
*H04B 10/11* (2013.01)
*H04B 10/67* (2013.01)

(52) U.S. Cl.
CPC ............. *H04B 10/11* (2013.01); *H04B 10/67* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS 5,311,353 A      5/1994   Crawford
7,282,689 B2 *  10/2007   Zimmerman ....... H01L 27/1443
                                                    257/E27.128
(Continued)

OTHER PUBLICATIONS

International Search Report dated Feb. 9, 2021 for PCT/EP2020/080594.

*Primary Examiner* — Hanh Phan
(74) *Attorney, Agent, or Firm* — Suiter Swantz pc llo

(57) ABSTRACT

An Optical Wireless Communication (OWC) receiver configured to receive an incoming optical beam modulated with data and output an output signal including the modulated data. A lens receives the incoming optical beam. Photodiodes positioned at a distance from the lens and proximal to the focal plane of the lens receive a fraction of the incoming optical beam and generate a photocurrent in correspondence with photons received. The photodiodes are provided in a two-dimensional array including rows and columns wherein outputs of the columns are combined and their photocurrents are summed. An amplifier connected to the combined output of the columns converts the summed photocurrents into an output signal. Interconnections of the photodiodes form at least two parallel branches wherein each branch includes a cascade of at least two photodiodes forming a combined photodetector surface.

12 Claims, 7 Drawing Sheets

(58) Field of Classification Search
CPC .. H04B 10/1149; H04B 10/116; H04B 10/40; H04B 10/67; H04B 10/60; H04B 10/69
USPC ....... 398/118, 119, 127, 128, 129, 130, 131, 398/135, 136, 202, 208, 209, 212, 158, 398/159, 172; 250/214 A, 214 LA, 214 R
See application file for complete search history.

(56) References Cited

U.S. PATENT DOCUMENTS

| | | | |
|---|---|---|---|
| 8,670,042 B2 | 3/2014 | Joboji et al. | |
| 10,756,815 B2* | 8/2020 | Shih | H04B 10/11 |
| 2006/0076473 A1* | 4/2006 | Wilcken | H04B 10/1121 |
| | | | 250/214 A |
| 2009/0123156 A1* | 5/2009 | Son | H04B 10/1141 |
| | | | 398/119 |
| 2016/0294472 A1 | 10/2016 | Palmer et al. | |

* cited by examiner

300

400

OPTICAL WIRELESS COMMUNICATION RECEIVER WITH LARGE PHOTODETECTOR SURFACE AREA, LARGE FIELD OF VIEW AND HIGH BANDWIDTH

FIELD OF THE INVENTION

The present invention relates generally to optical wireless communications, and more in particular to an optical wireless communication receiver having a large photodetector surface area and a high bandwidth.

BACKGROUND OF THE INVENTION

Although use and innovation of Radio Frequency, RF, based communication is making steady progress, its popularity is also leading to congestion of the radio spectrum. Optical Wireless Communication, OWC, is a form of optical communication in which unguided visible, infrared (IR), or ultraviolet (UV) light is used to carry a signal. OWC is quickly gaining interest in industry since the spectrum of (visible) light (with a wavelength range of about 400-700 nm) offers no less than 320 THz of bandwidth, and the spectrum commonly used in long-reach fibre optical communication (1500-1600 nm) about 12.5 THz, both much larger than even the upcoming THz radio technologies can offer.

OWC can be used, among others, in a wide range of applications including wireless local area networks, wireless personal area networks and vehicular networks. The OWC systems that operate in the visible band are commonly referred to as Visible Light Communication, VLC, systems. The communicated data is modulated by pulsing the visible light at high speeds without noticeable effect on the lighting output and the human eye. VLC systems can be piggybacked on LED illumination systems, as the LED's output light may not only serve illumination purposes but the LED may also be modulated with data, although with limited bandwidth as the LED is basically not designed for that.

The OWC systems that operate in the Infra-Red, IR, and near-IR band offer a protocol-transparent link with high data rates. Such OWC systems use infrared beams which each can be directed on-demand to user devices. In this way, individual wireless links can be established to those devices with very high congestion-free capacity and high privacy as these beams are not shared and cannot be accessed by users which are not within the beam's footprint.

OWC systems have a lot of advantages over RF based communication systems. As indicated, OWC systems have huge bandwidth potential, but moreover, the optical spectrum is unregulated and unlicensed. Since light cannot penetrate walls, OWC systems provide enhanced privacy and security.

Besides these advantages, OWC systems also have several technical challenges, such as the challenge to efficiently steer the optical narrow beams individually and the challenge of how to align the optical receiver at the user device without the need of delicate accurate alignment efforts. Such delicate and accurate alignment would complicate the user's device and thus lead to increased costs.

The basic physics Law of Etendue points out that the product of cross-sectional aperture area and of the solid angle sustained is limited; one cannot increase one without decreasing the other one. E.g., one may use a large-diameter lens to collect much light, and with this lens focus it on a small high-speed photodetector. This is the approach which is typically taken for building an optical receiver in an OWC system. However, only a slight angular offset of the incoming beam with respect to the lens shifts the focused beam laterally with respect to the small detector, hence reception is lost. This shift is proportional to the focal length of the lens. As a large diameter lens typically comes with a large focal length, the large aperture therefore only allows small angular beam offsets, i.e. a limited field-of-view angle (FoV).

SUMMARY OF THE INVENTION

Accordingly, it is an object of the present disclosure, to provide an improved OWC receiver which compared to prior art OWC receivers has a large photodetector surface and large FoV without reduction in bandwidth.

In a first aspect, there is provided an Optical Wireless Communication, OWC, receiver for receiving an incoming optical beam modulated with data and outputting an output signal comprising the modulated data, the receiver comprising:

a lens arranged to receive the incoming optical beam;

a plurality of photodiodes positioned at a distance from the lens and positioned at or closely to the focal plane of the lens, each of the plurality of photodiodes being arranged to receive a fraction of the incoming optical beam and to generate a photocurrent in correspondence with photons received from the fraction of the incoming optical beam, wherein the plurality of photodiodes (N) are arranged in a two-dimensional array (N=M×K) comprising rows (1 ... M) and columns (1 ... K), and wherein outputs of the columns (1 ... K) are combined and their photocurrents are summed;

an amplifier connected to the combined output of the columns (1 ... K) of the two-dimensional array and arranged to convert the summed photocurrents into the amplifier output signal;

wherein interconnections of the photodiodes of the two-dimensional array (M×K) are configured to form at least two parallel branches (1 ... K, wherein K≥2) of photodiodes, and wherein each of the parallel branches comprises a cascade (1 ... M, wherein K≥2) of at least two photodiodes forming a combined photodetector surface.

The inventor has found that it is possible to increase the photodetector surface, and thus increase the aperture without reducing the bandwidth of the receiver. In accordance with the first aspect of the present disclosure, this is achieved by introducing an OWC receiver having a lens and a plurality of photodiodes which are positioned at a distance from the lens such that they are located at or closely to (i.e. preferably before) the focal plane of that lens. In particular, the plurality of photodiodes are arranged to receive a fraction of the incoming optical beam and to generate a photocurrent in correspondence with photons received from the fraction of the incoming optical beam, and the plurality of photodiodes (N) are arranged in a two-dimensional array (N=M×K) of rows (1 ... M) and columns (1 ... K). The outputs of the columns are collected, combined and their photocurrents are summed. These summed photocurrents are fed to an amplifier, in particular a transimpedance amplifier, which converts the summed photocurrents into the amplifier's output signal.

The inventor has found that when the interconnections of the photodiodes of the two-dimensional array (M×K) are configured as a matrix to form at least two parallel branches (1 ... K, wherein K≥2) of photodiodes, and wherein each of the parallel branches comprises a cascade (1 ... M, wherein K≥2) of at least two photodiodes, a receiver is obtained of which the photodetector surface and bandwidth are configurable by definition of the interconnections which define the number of parallel branches and the number of cascaded photodiodes per branch. The receiver with the two-dimensional array according to the present disclosure generates an output signal which is generated by N=M×K photodiodes (thus with a combined photodetector surface which is N times larger than that of a single photodiode) which is for low frequencies K times larger than that of the receiver with a single photodiode, and the receiver's bandwidth is M/K times larger. This is explained in more detail below.

What is proposed, is to combine multiple photodiodes in a novel way, by which the jointly or combined established photodetector area increases while achieving a high bandwidth too. With the thus obtained larger area the amount of light received from the incident beam (which is typically much larger than the single photodiode) can be increased, and in combination with the lens system also the angular aperture (the FoV) of the OWC receiver can be increased. By the proposed array or matrix of photodiodes in which the photodiode's photodetector surface, i.e. its active area, is increased, a trade-off between the OWC receiver's sensitivity and its bandwidth can be obtained without requiring complex high-frequency electronics nor additional alignment control algorithms.

The proposed OWC receiver is arranged to receive an incoming optical beam which is modulated with high-speed data, and converts this to an electrical output signal. To do this, the OWC receiver deploys a photodiode which is followed by an electrical amplifier, in particular a transimpedance amplifier, which converts the summed photocurrents into the amplifier's output signal. The diameter of the beam is typically much larger than the active area of the photodiode, so to maximize the output signal the photodiode should capture as much as possible power of the incoming beam. The optical beam is captured by a lens first, and then projected onto the photodiode. To maximize the captured optical power as well as to avoid the need for careful angular alignment with respect to the beam, an OWC receiver is proposed with a large cross-sectional aperture, as well as a wide field-of-view (FoV, i.e. large angular range). Since the photodetection area is formed by several individual photodiodes jointly, the individual active photodetection areas are small, which is typically required for an OWC receiver with a large bandwidth.

By having several photodiodes in parallel the collectively generated photocurrent increases. It however inevitably also adds their capacitances and thus reduces the joint bandwidth. Putting photodiodes in series implies putting their capacitances in series and thus increases the joint bandwidth, but without generating more photocurrent. This option is typically rejected as an ideal photodiode acts as a current source and common wisdom is that current sources cannot be put in series. Recognizing that a typical photodiode is not a perfect current source and has a limited parallel resistance, it is proposed to combine putting photodiodes in series with putting photodiodes in parallel, and according to the first aspect a two-dimensional array or matrix of M×K interconnected photodiodes is proposed, which array is preferably integrated on a single chip.

Each photodiode of the array may be represented by an equivalent electrical circuit which consists of a (typically large) resistance which accounts for the leakage current, a capacitance of the reverse-biased photodiode junction, a current source of the (typically small) dark current generated by thermal effects, and a current source representing the photocurrent itself as a response to the fraction of the optical beam impinging on the active area of the photodiode.

By applying repetitively Thevenin's and Norton's theorems (well known from electronics textbooks), the whole array of M×K photodiodes can be represented by a single equivalent photodiode circuit of which the output current and internal impedance $Z_{tot}$ are $$i_{out}(t) = \frac{K \cdot [i_d + R_{PD} \cdot \overline{a_{mk}} \cdot P(t)]}{1 + \frac{R_s}{R_d}(1 + j\omega R_d C_d)}$$

$$Z_{tot} = \frac{MR_p[R_d + R_s(1 + j\omega R_d C_d)]}{R_d + (R_s + K \cdot R_p)(1 + j\omega R_d C_d)}$$

where $\overline{a_{mk}}$ is the average fraction of the optical beam power which arrives onto the $(m,k)^{th}$ photodiode. When applying the photodiode matrix in an optical receiver using a transimpedance pre-amplifier (TIA) circuit or any other suitable (pre-)amplifier, its transimpedance $Z_T = V_{out}(t)/i_{tot}(t)$ near $\omega=0$ (DC) and its $\omega_{-3\ dB}$ bandwidth (with $R_s << R_d$) are $$Z_r(\omega = 0) = \frac{A \cdot Z_t}{1 + A + \frac{Z_t}{MR_p} + \frac{K}{M} \cdot \frac{Z_t}{R_d + R_s}}$$

$$\omega_{-3dB} \approx \frac{M}{K} \cdot \frac{1}{C_d}\left[\frac{1+A}{Z_t} + \frac{1}{R_p}\right] + \frac{1}{R_d C_d}$$

When using a single photodiode, it gives $$Z_r(\omega = 0) = \frac{A}{1+A} Z_t$$

$$\omega_{-3dB} = \frac{1+A}{C_d \cdot Z_t}$$

Hence, in good approximation (given that $R_d >> R_s$ and $R_p >> Z_t/(1+A)$) the −3 dB bandwidth of the receiver using the M×K photodiode matrix is (M/K) times the bandwidth of the receiver using a single photodiode. With the proposed M×K photodiode matrix and neglecting dark current, the generated current is $i_{out}(t) \approx K \cdot R \cdot \bar{a} \cdot P(t)$, so about K times as large as for a single photodiode. In particular: with a square M×M matrix (i.e. the case where M=K) of photodiodes followed by the TIA the same bandwidth is achieved as with a single photodiode, whereas the active area is $M^2$ times larger, and the output signal is M times larger. Hence, an OWC receiver is obtained in which the bandwidth and active area are configurable by adjusting the number of rows and columns of the array.

In an example, the number of parallel branches (1 ... K) of the two-dimensional array (N=M×K) is larger than the number of cascaded (1 ... M) photodiodes comprised in each of the branches (M<K).

By configuring the matrix in such a way, i.e. by the interconnections between the photodiodes, that the number parallel branches (1 ... K) is increased, the collectively generated photocurrent increases beyond what is reached for the M=K case as well, but inevitably also adds their capacitances and thus also reduces joint bandwidth to below what is reached for the M=K case.

In an example, the number of parallel branches (1 ... K) of the two-dimensional array (N=M×K) is smaller than the number of cascaded (1 ... M) photodiodes comprised in each of the branches (M>K).

By configuring the matrix in such a way, i.e. by the interconnections between the photodiodes, that the number of cascaded (1 . . . M) photodiodes comprised in each of the branches is increased, the capacitances are put in series and thus the joint bandwidth is increased as well. Cascading photodiodes is typically considered as undesirable as an ideal photodiode acts as a current source and common knowledge teaches that current sources cannot be put in series. The inventor has however recognized that a typical photodiode is not a perfect current source and has a limited parallel resistance, and therefore this option is reconsidered in combination with putting photodiodes in parallel. Hence, what is proposed is a two-dimensional matrix of M×K interconnected photodiodes, preferably integrated on a single chip.

In an example, the number of parallel branches (1 . . . K) of the two-dimensional array (N=M×K) equals the number of cascaded (1 . . . M) photodiodes comprised in each of the branches (M=K).

In an example, the lens projects the received optical beam onto a surface area which is larger than the combined surface area of the two-dimensional array of photodiodes.

In an example, the two-dimensional array of the photodiodes defining the rows and the columns of the two-dimensional array (N=M×K) comprises interconnections of the photodiodes wherein respective interconnections defining each column (1 . . . M) are also interconnections defining the rows (1 . . . K).

In an example, each of the rows of the two-dimensional array further comprises a resistor positioned in parallel over the photodiodes of the respective row.

In an example, each of the resistors is positioned outside of the two-dimensional array of the photodiodes.

In an example, each of the resistors is integrated inside of the two-dimensional array of the photodiodes.

In a second aspect of the present disclosure, an Optical Wireless Communication, OWC, system is provided which comprises a receiver or a plurality of receivers according to any of the previous descriptions.

In a third aspect of the present disclosure, the OWC system is adapted to provide optical communication via electromagnetic radiation with a wavelength in any one of the visible light spectrum, infrared light spectrum, near infrared light spectrum or ultraviolet light spectrum.

In a fourth aspect of the present disclosure, the Optical Wireless Communication, OWC, system, comprises one or more receivers according to any of the previous claims 1-9, wherein said OWC system is adapted for application in any one of a wireless local area network, wireless personal area network, and a vehicular network.

The skilled person will appreciate that all examples and advantages of the first aspect of the present disclosure are equally applicable for the second aspect of the present disclosure.

DETAILED DESCRIPTION OF THE INVENTION

Figure 1A:
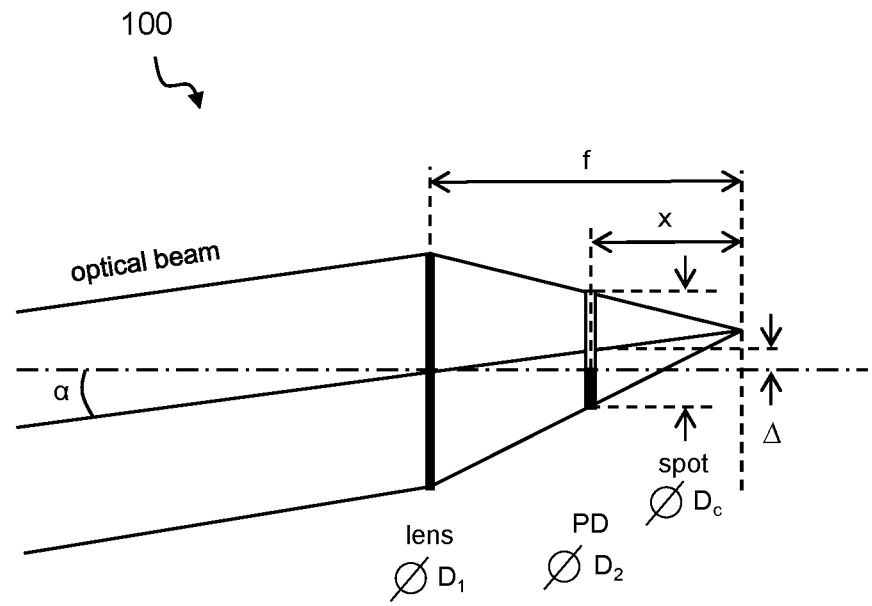
FIG. 1A: shows the Field-of-View half-angle $\alpha$ of an OWC receiver according to the present disclosure wherein the optical beam arrives at angle $\alpha$ which illuminates the photodiode (PD) with diameter $D_2$ through a lens with a diameter $D_1$ and a focal length f where the photodiode is defocused over a distance x with respect to the focal plane of the lens.
Figure 1B:
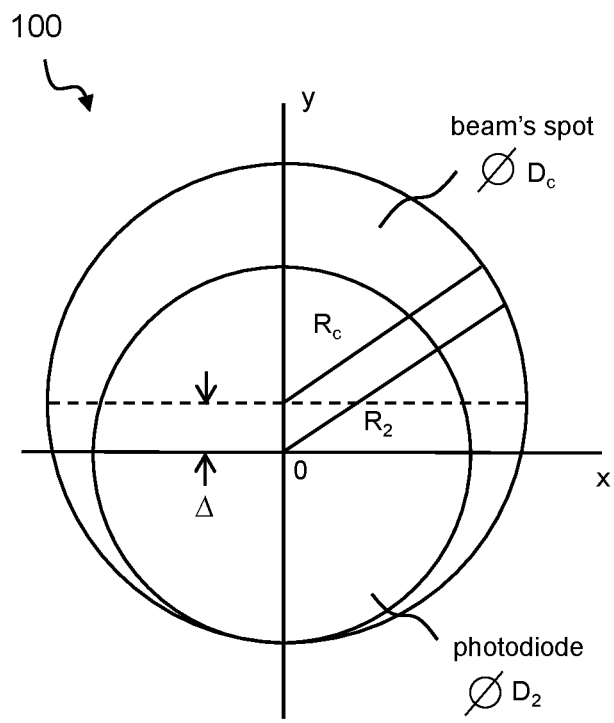
FIG. 1B: shows projecting the beam's spot onto the photodiode. The defocused spot with radius $R_c = D_c/2$ is illuminating the photodiode with radius $R_2 = D_2/2$.

As illustrated by FIG. 1, the proposed OWC receiver receives the incoming optical beam that is modulated with the high-speed data, and converts this to an electrical output signal. To do this, the OWC receiver deploys a photodiode (PD in FIG. 1) which is followed by an electrical amplifier. The diameter of the optical beam is typically much larger than the active area of the photodiode, so to maximize the output signal the photodiode should capture as much as possible power of the incoming beam. As shown in FIG. 1, the optical beam is captured by a lens first, and then projected onto the photodiode. To maximize the captured optical power as well as avoiding the need for careful angular alignment with respect to the beam, the OWC receiver should have a large cross-sectional aperture, as well as a wide Field-of-View (FoV, i.e. large angular range). But to handle high data speeds, the OWC receiver should also have a large bandwidth, which typically requires a photodiode with a small active photodetection area.

If the photodiode is to be fully covered by the beam's defocused spot, then $D_c = p \Delta D_1 > D_2$. For this full coverage, the allowable displacement $\Delta$ of the centre of the spot with respect to the centre of the photodiode (with defocusing parameter p=x/f, with $0 \leq p < 1$) is $$\Delta \leq \frac{1}{2}(D_c - D_2) = \frac{1}{2}(p \cdot D_1 - D_2)$$

The optical power $P_{det}$ incident on the photodiode as fraction of the total optical power in the spot $P_{spot}$ is $$P_{det} = P_{spot} \cdot \left(\frac{D_2}{D_c}\right)^2 = P_{spot} \cdot \frac{1}{p^2} \cdot \left(\frac{D_2}{D_1}\right)^2$$

For the Field-of-View half angle $\alpha$ holds $$\tan\alpha = \frac{\Delta}{f - x} = \frac{p \cdot D_1 - D_2}{2f(1 - p)}$$

Figure 2A:
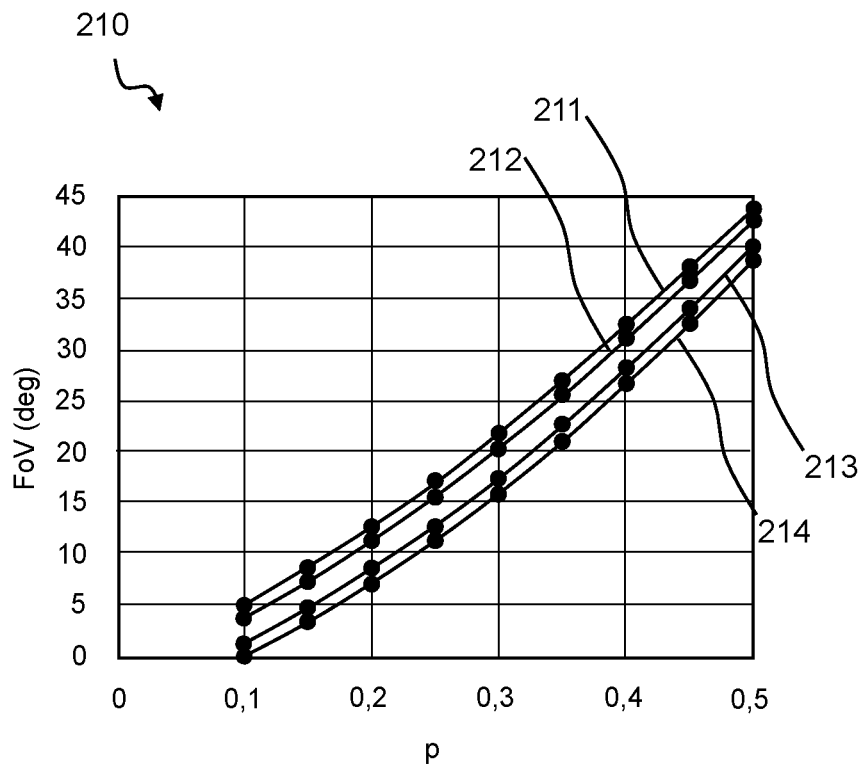
FIG. 2A shows the Field-of-View half angle $\alpha$ and FIG. 2B the photo-detected fraction T of incident optical beam versus the defocusing parameter p (where p is defined as p=x/f) for lens diameter $D_1 = 10$ mm, and lens focal length f=5 mm, and for various diameters $D_2$ of the photodiode.
Figure 2B:
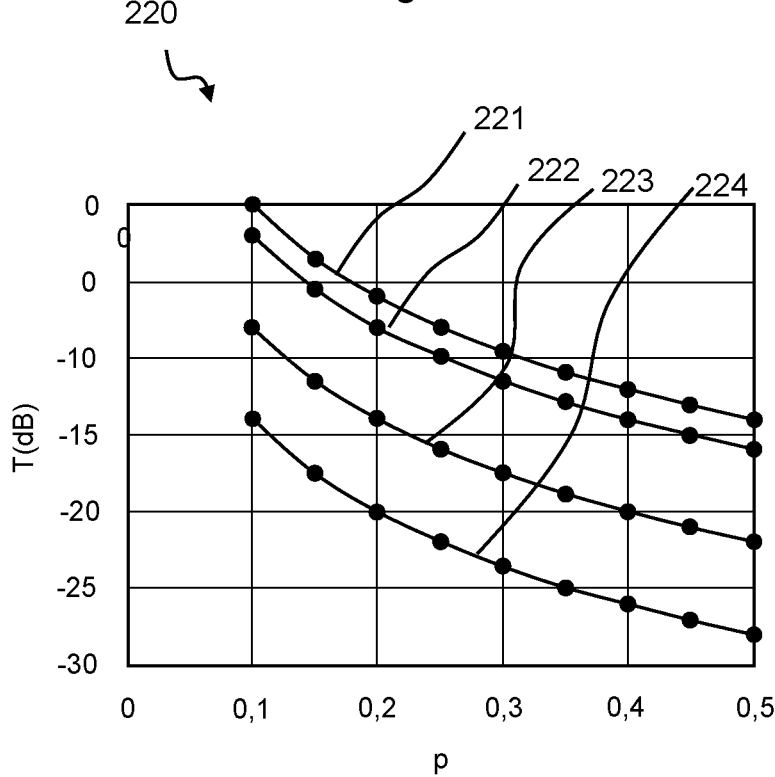

As shown in FIG. 2A, the FoV's half angle α is increased when defocusing is applied, with a diameter $D_2$ of the photodiode of 0.2 mm as indicated by reference 211, a diameter of 0.4 mm as indicated by reference 212, a diameter of 0.8 mm as indicated by reference 213, and a diameter of 1.0 mm as indicated by reference 211. The FoV decreases slightly when the photodiode diameter is increased; on the other hand, the photodetected power increases considerably, as shown in FIG. 2B. In FIG. 2B the photo-detected fraction T of incident optical beam is shown versus the defocusing parameter p, where p is defined as p=x/f for lens diameter $D_1$=10 mm, and lens focal length f=5 mm, and for various diameters $D_2$ of the photodiode, i.e. with a diameter $D_2$ of the photodiode of 1.0 mm as indicated by reference 221, a diameter of 0.8 mm as indicated by reference 222, a diameter of 0.4 mm as indicated by reference 223 and a diameter of 0.2 mm as indicated by reference 212.

Single Photodiode

Figure 3:
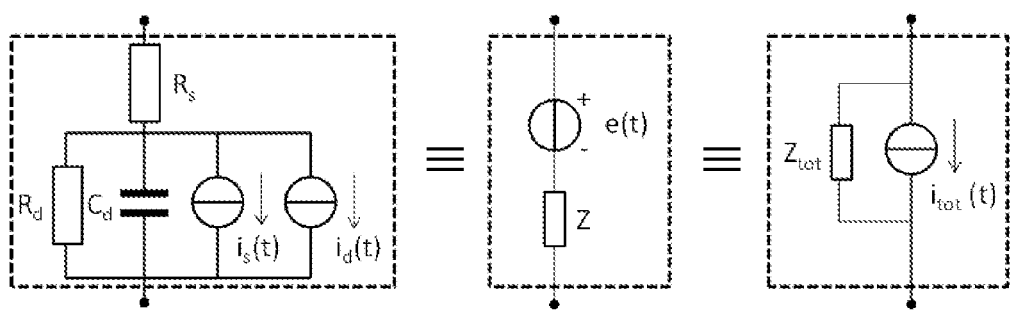
FIG. 3: shows an electrical circuit equivalent circuit of a single photodiode.

FIG. 3 (left) describes the electrical circuit equivalent of a single photodiode, with serial resistance $R_s$, parallel resistance $R_d$, capacitance $C_d$, dark current $i_d(t)$, and photocurrent $i_s(t)$. A p-i-n photodiode is typically biased by a reverse voltage across its intrinsic region, and when photons penetrate into this region electron-hole pairs are generated which due to the electric field travel to the anode and cathode electrodes of the photodiode, respectively, and thus generate the photocurrent $i_s(t)$. The (typically small) serial resistance $R_s$ includes the bonding wires to the photodiode chip, the (high) parallel resistance $R_d$ includes the leakage current, and the (small) dark current $i_d(t)$ is generated by thermal effects. The photo-current is $i_s(t)=R·a·P(t)$ where R is the responsivity of the photodiode (in A/W), and a is the fraction of the instantaneous optical beam power P(t) which is detected by the active area of the photodiode.

Applying Thevenin's theorem, as shown in FIG. 3 (middle) the photodiode can be represented by an equivalent circuit with a voltage source e(t) and serial impedance Z, and alternatively by applying Norton's theorem as shown in FIG. 3 (right) also by an equivalent circuit with a current source $i_{tot}(t)$ and the same impedance $Z_{tot}=Z$ in parallel, where $$e(t) = Z_d \cdot (i_s(t) + i_d) = \frac{R_d}{1 + j\omega R_d C_d} \cdot (i_s(t) + i_d)$$

$$i_s(t) = a \cdot R \cdot P(t)$$

$$Z_{tot} = Z = Z_d + R_s = \frac{R_d}{1 + j\omega R_d C_d} + R_s$$

$$i_{tot}(t) = \frac{e(t)}{Z_{tot}} = \frac{i_s(t) + i_d}{1 + \frac{R_i}{R_d}(1 + j\omega R_d C_d)}$$

Optical Receiver

Figure 4:
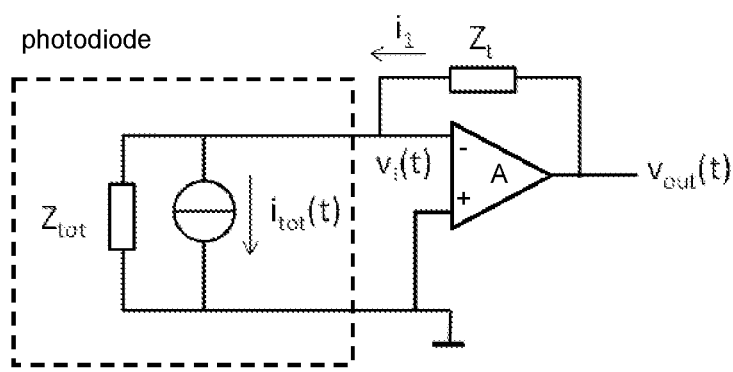
FIG. 4: shows an optical transimpedance receiver.

To process the signals after the photodetection, an electronic high-frequency low-noise amplifier is applied after the photodiode. A well-known typical example is a transimpedance amplifier (TIA), of which the circuit schematics are shown in FIG. 4 (where A is the open-loop gain of the amplifier, and $Z_t$ its feedback impedance). Its amplification is expressed as a transimpedance $Z_T$, for which can be derived that $$Z_T = \frac{v_{out}(t)}{i_{tot}(t)} = \frac{A \cdot Z_t}{1 + A + (Z_t/Z_{tot})}$$

Substituting the single-photodiode model yields $$Z_T = \frac{A \cdot Z_t}{1 + A + Z_t/\left(\frac{R_d}{1 + j\omega R_d C_d} + R_s\right)} \approx \frac{A \cdot Z_t}{1 + A + j\omega \cdot C_d \cdot Z_t} \text{ for}$$

$$R_s \ll R_d \text{ and } R_d \gg 1$$

which gives for the low-frequency receiver transimpedance and the receiver's −3 dB bandwidth, respectively, $$Z_r(\omega = 0) = \frac{A}{1 + A} Z_t$$

$$\omega_{-3dB} = \frac{1 + A}{C_d \cdot Z_t}$$

Multiple Photodiodes in Parallel

Figure 5:
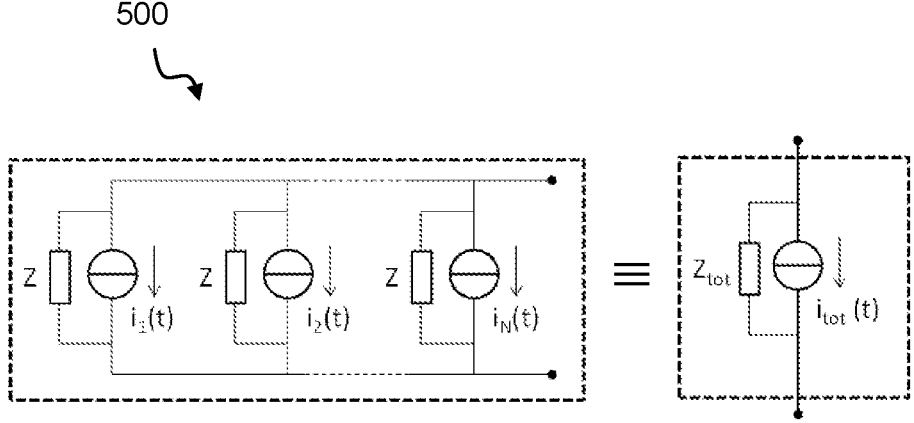
FIG. 5: shows an example of the electrical circuit equivalent of putting N photodiodes in parallel.

To increase the active area, N photodiodes can be put in parallel. The circuit model of such parallel arrangement is shown in FIG. 5. The current source model of FIG. 3 (right) for the single photodiode is extended to connecting N of these models in parallel, which implies that the currents can be simply added and the impedance is divided by N:

$$i_{tot}(t) = \sum_{n=1}^{N} i_n(t) = \sum_{n=1}^{N} (a_n \cdot R \cdot P(t) + i_d) = N \cdot i_d + R \cdot P(t) \sum_{n=1}^{N} a_n =$$

$$N \cdot i_d + N \cdot \bar{a} \cdot R \cdot P(t) Z_{tot} = \frac{1}{N} Z = \frac{1}{N}\left(\frac{R_d}{1 + j\omega R_d C_d} + R_s\right)$$

From this analysis, it can be observed that the equivalent capacitance $C_{eq} \approx N \cdot C_d$ and the generated photocurrent is $i_{tot}(t) \approx N \cdot \bar{a} \cdot R \cdot P(t)$, where each photodiode is illuminated by a fraction $a_n$ of the beam's power and $$\bar{a} = \frac{1}{N} \sum_{n=1}^{N} a_n$$

denotes the average fraction of the beam power which is incident on a single photodiode. So, the generated photocurrent is N times the average current generated by an individual photodiode.

Applying the N parallel photodiodes in a transimpedance amplifier, its transimpedance $Z_T$ is found to be $$Z_T = \frac{A \cdot Z_t}{1 + A + N \cdot Z_t/\left(\frac{R_d}{1 + j\omega R_d C_d} + R_s\right)} \approx \frac{A \cdot Z_t}{1 + A + j\omega \cdot N \cdot C_d Z_t} \text{ for}$$

$$R_s \ll R_d \text{ and } R_d \gg 1$$

And thus, the low-frequency receiver gain and the receiver's −3 dB bandwidth are, respectively, $$Z_T(\omega = 0) = \frac{A}{1 + A} Z_t$$

$$\omega_{-3dB} = \frac{1 + A}{N \cdot C_d \cdot Z_t}$$

In comparison with the single-photodiode receiver, the generated photocurrent is N times larger, hence a reference transimpedance $Z_{T,ref}$ may be defined which expresses the output signal $v_{out}(t)$ as generated by the average photo-generated current per photodiode $\bar{a} \cdot R \cdot P(t)$ $$Z_{T,ref}(\omega = 0) = \frac{v_{out}(t)}{\bar{a} \cdot R \cdot P(t)} = N \cdot \frac{A}{1+A} Z_t$$

Hence the output signal generated by the receiver with the N photodiodes in parallel is N times larger than that of the receiver with a single photodiode, but the receiver's bandwidth is N times smaller.

Multiple Photodiodes in Series

Figure 6:
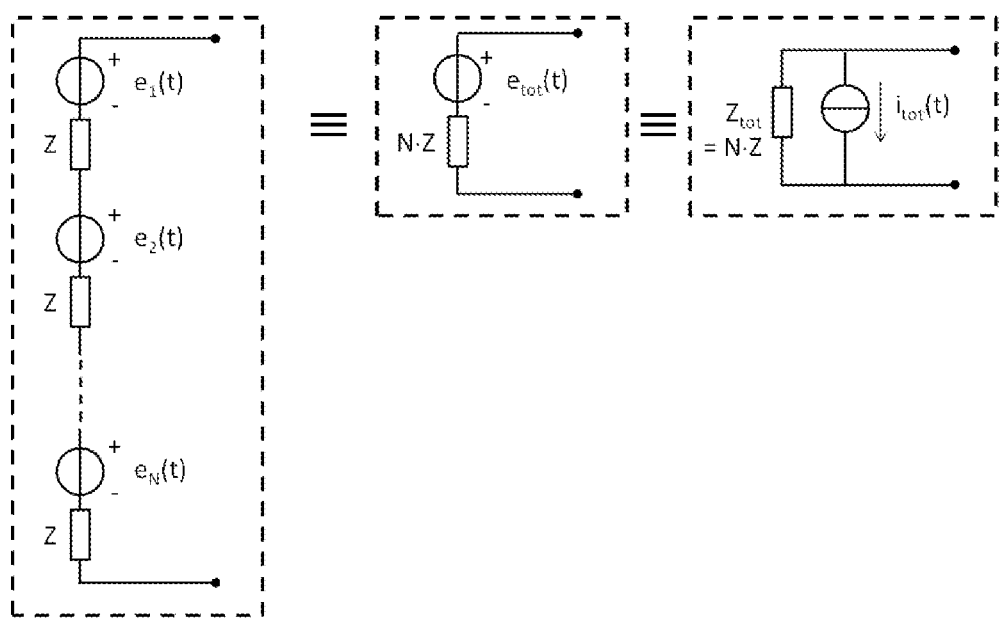
FIG. 6: shows an example of the electrical circuit equivalent of putting N photodiodes in series.

Alternatively, the active area can be extended by putting N identical photodiodes in series. The equivalent circuit of such cascade of photodiodes is shown in FIG. 6. Applying the equivalent voltage source circuit of the single photodiode in FIG. 3 (middle), this cascade is represented by FIG. 6 (left), where the n-th photodiode receives a fraction $a_n$ of the beam's power $P(t)$, hence its photocurrent is $i_{s,n}(t) = a_n \cdot R \cdot P(t)$, and according to Thevenin can be represented again (similar as in FIG. 3 (middle)) as a voltage source $e_n(t)$ with serial impedance Z. As FIG. 6 (middle) shows, this series of voltage sources can be summed, as well as the impedances, into a single voltage source $e_{tot}(t)$ and single serial impedance N×Z, which subsequently according to Norton can be represented by a single current source $i_{tot}(t)$ and same impedance $Z_{tot} = N \times Z$ in parallel. The relations are given by $$i_{s,n}(t) = a_n \cdot R \cdot P(t)$$

$$e_{tot}(t) = \sum_{n=1}^{N} e_n(t) = \frac{N \cdot N_d}{1 + j\omega R_d C_d}(i_d + \bar{a} \cdot R \cdot P(t)) \text{ with } \bar{a} = \frac{1}{N}\sum_{n=1}^{N} a_n$$

$$Z_{tot} = N \cdot Z = N\left(\frac{R_d}{1 + j\omega R_d C_d} + R_s\right)$$

$$i_{tot}(t) = \frac{e_{tot}(t)}{N \cdot Z} = \frac{i_d + d \cdot R \cdot P(t)}{1 + \frac{R_s}{R_d}(1 + j\omega R_d C_d)}$$

where $$\bar{a} = \frac{1}{N}\sum_{n=1}^{N} a_n$$

denotes the average fraction of the beam power which is incident on a single photodiode. Assuming small $R_s$ and large $R_d$, it is observed that the equivalent capacitance $C_{eq} \approx C_d/N$, so the cascading of the N photodiodes yields a reduction of the equivalent capacitance with a factor N, whereas the generated photocurrent $i_{tot}(t)$ at low frequencies (so $\omega << 1$) is $i_{tot}(t) = i_s(t) \approx \bar{a} \cdot R \cdot P(t)$, i.e. the same as the current generated by an individual photodiode when all photodiodes are illuminated by an equal fraction of the beam's power.

Applying the series of photodiodes in the transimpedance amplifier scheme, it is found that $$Z_T = \frac{A \cdot Z_t}{1 + A + Z_t \left[N \cdot \left(\frac{R_d}{1 + j\omega R_d C_d} + R_s\right)\right]} \approx$$

$$\frac{A \cdot Z_t}{1 + A + j\omega \cdot Z_t \cdot C_d/N} \text{ for } R_s \ll R_d \text{ and } R_d \gg 1$$

And thus, for the low-frequency receiver gain and the receiver's −3 dB bandwidth, respectively, $$Z_T(\omega = 0) = \frac{A}{1+A} Z_t$$

$$\omega_{-3dB} = N \cdot \frac{1+A}{C_d \cdot Z_t}$$

In comparison with the single-photodiode receiver, the generated photocurrent is the same, hence a reference transimpedance $Z_{T,ref}$ may be defined which expresses the output signal as generated by the average signal $$Z_{T,ref}(\omega = 0) = \frac{v_{out}(t)}{\bar{a} \cdot R \cdot P(t)} = \frac{A}{1+A} Z_t$$

Hence the output signal generated by the receiver with the N photodiodes in series is the same as that of the receiver with a single photodiode, but the receiver's bandwidth is N times larger.

As the photodiodes each need to be biased with a reverse voltage which is adequate for achieving its detection and bandwidth performance, the reverse bias voltage $V_n$ (with n=1 ... N) per photodiode n when putting them in series needs to be assessed, including its sensitivity for slight asymmetries in the characteristics of the photodiodes and in the photocurrents generated by them.

The DC current $I_n$ generated by incident light with power $P_n$ on the active area of a photodiode n which is reverse-biased with a voltage $V_n$ is known to be $$I_n = I_{On}\left(1 - e^{-\frac{qV_n}{kT}}\right) + a_n \cdot R_n \cdot P$$

where $I_{on}$ is the photodiode's dark current, $R_n$ photodiode responsivity, $P_n$ incident optical power on photodiode n (note that $R_n \cdot P_n < I_n < R_n \cdot P_n + I_{on}$; at room temperature, kT/q≈25 mV).

Figure 7:
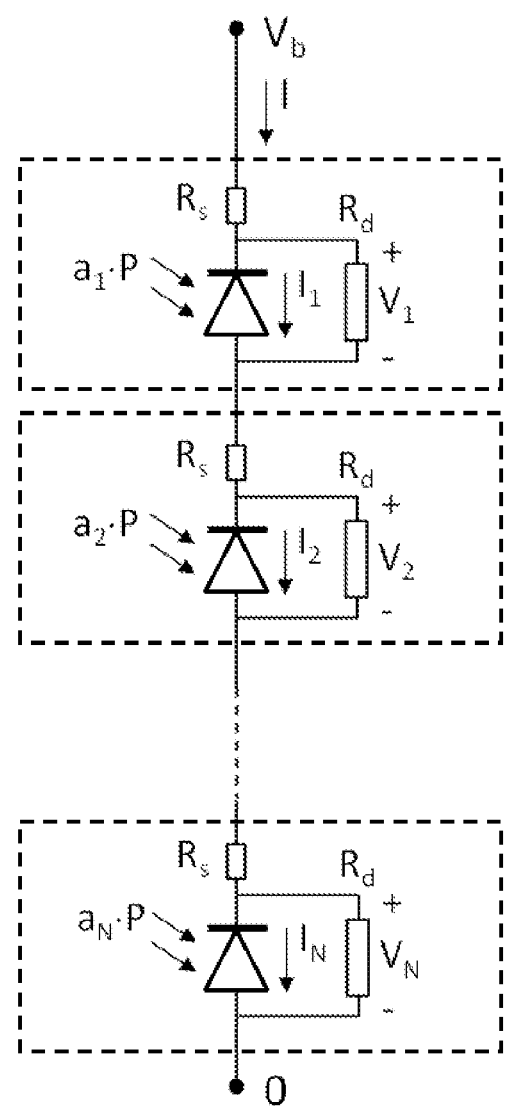
FIG. 7: shows the DC bias voltage $V_n$ (n=1 . . . N) of each photodiode when putting N photodiodes in series.

FIG. 7 shows putting N photodiodes in series and applying the bias voltage $V_b$ across the whole series. A resistance $R_d$ in parallel and resistance $R_s$ in series with the photodiode has been included (in accordance with FIG. 3).

For the current I generated by the series of photodiodes holds $$I = I_n + \frac{1}{R_d}V_n = I_{On}\left(1 - e^{-\frac{qV_n}{kT}}\right) + a_n R_n P + \frac{V_n}{R_d}$$

which under typical reverse bias conditions where $V_n >> kT/q$ is well approximated by $$I \approx I_{On} + a_n R_n P + \frac{V_n}{R_d}$$

Hence $$V_b = N \cdot I \cdot R_s + \sum_{n=1}^{N} V_n = N \cdot I \cdot (R_s + R_d) - N \cdot R_d (\overline{I_{On}} + \overline{a_n R_n} \cdot P)$$

$$I = \frac{V_b + N \cdot R_d (\overline{I_{On}} + \overline{a_n R_n} \cdot P)}{N \cdot (R_s + R_d)}$$

$$V_n = R_d \left[ \frac{V_b + N \cdot R_d (\overline{I_{On}} + \overline{a_n R_n} \cdot P)}{N \cdot (R_s + R_d)} - I_{On} - a_n R_n \cdot P \right]$$

$$V_n = \frac{R_d}{R_d + R_s} \cdot \frac{V_b}{N} + \frac{R_d^2}{R_d + R_s} (\overline{I_{On}} + \overline{a_n R_n} \cdot P) - R_d (I_{On} + a_n R_n \cdot P)$$

In good approximation, as typically $R_d \gg R_s$ $$V_n \approx \frac{V_b}{N} + R_d (\overline{I_{On}} - I_{On} + \overline{a_n R_n} \cdot P - a_n R_n \cdot P) \text{ for } R_d \gg R_s$$

Figure 8:
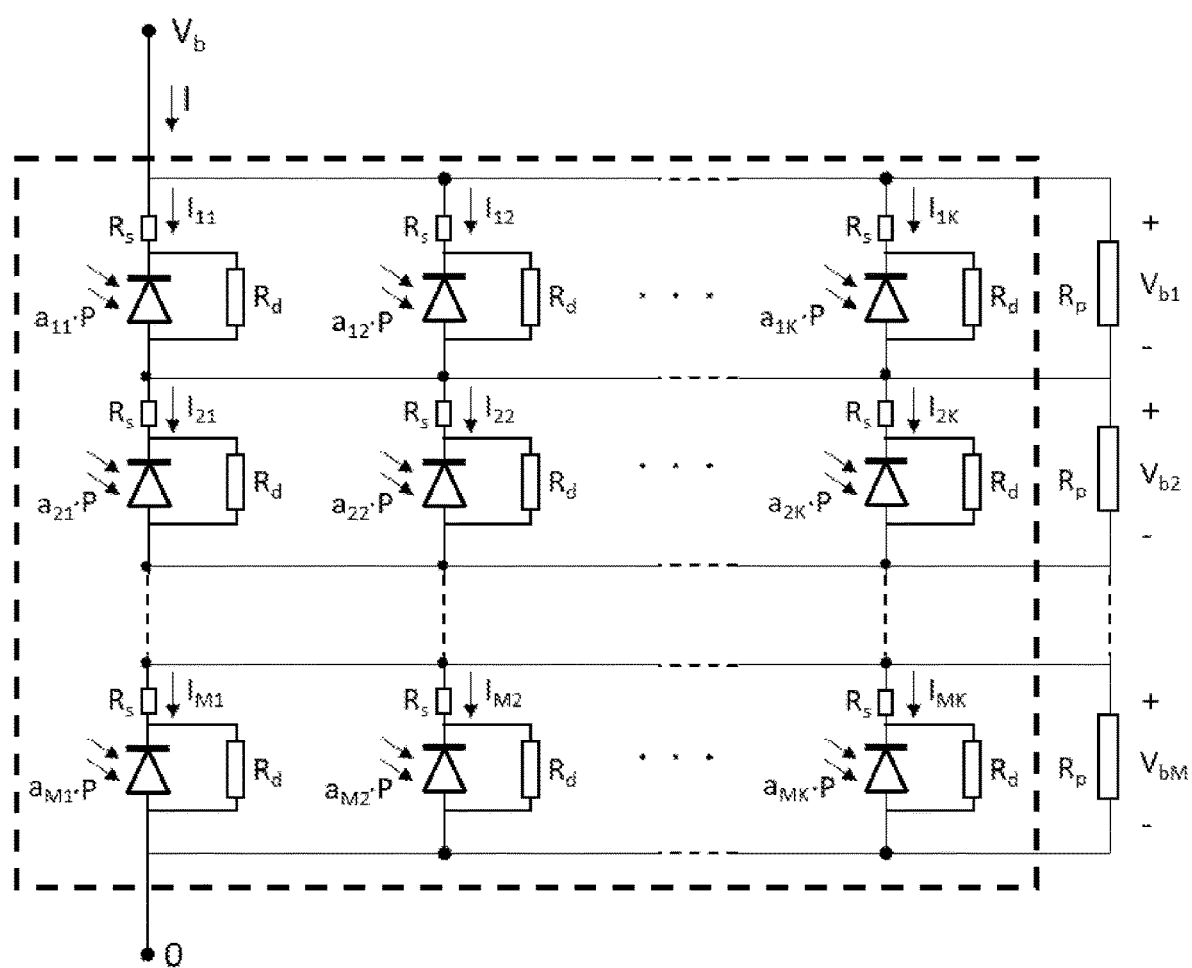
FIG. 8: shows an example of the 2D matrix of photodiodes with a resistor $R_p$ positioned in parallel over the photodiodes of each row.

Hence, the total bias voltage $V_b$ is equally divided among the N photodiodes, yielding a bias voltage $V_b/N$ for each photodiode, where per photodiode n a bias voltage deviation can occur which is the product of its parallel resistance $R_d$ and the difference of the individual dark current $I_{on}$ and the individual generated photocurrent $R_n \cdot P_n$ with respect to the average values of these currents. By having all photodiodes integrated on the same chip, these differences will be small. By lowering $R_d$, e.g. by putting an external resistor in parallel to each photodiode (as shown in FIG. 8 in which each row of the matrix has such a resistor $R_p$ which is located outside of the matrix), the individual bias voltage deviation resulting from these differences can be reduced (if that is needed for adequate performance).

Multiple Photodiodes in Series/Parallel in a 2D Matrix

Figure 9:
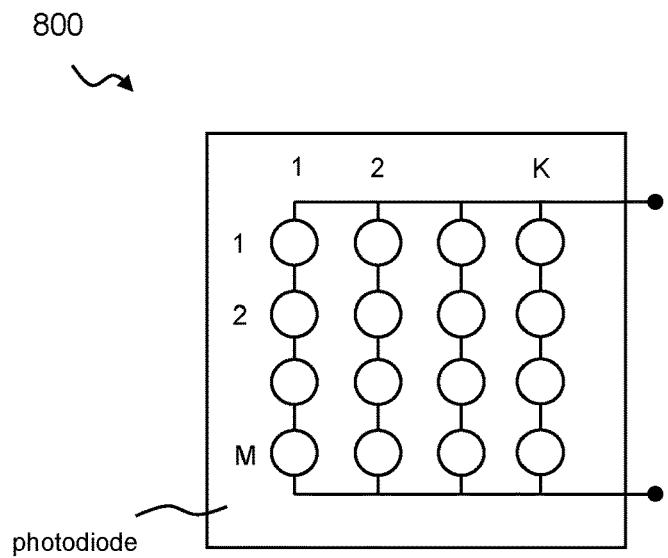
FIG. 9: Putting multiple photodiodes in a serial/parallel 2D matrix (M photodiodes in series, and K series of M photodiodes in parallel)

It is proposed to put the photodiodes in a two-dimensional M×K matrix, which has M photodiodes in series, and K of such series in parallel; see FIG. 9.

The relations determining the current source $i_{tot}(t)$ and impedance $Z_{tot}$ in the Thevenin equivalent circuit are (using the before-mentioned results of the analyses for the series- and parallel-connected 1D photodiode structures)

$$i_{tot}(t) = \sum_{k=1}^{K} i_{tot,k}(t) = \sum_{k=1}^{K} \frac{i_d + R \cdot a_K \cdot P(t)}{1 + \frac{R_s}{R_d}(1 + j\omega R_d C_d)} = K \cdot \frac{i_d + \theta \cdot a \cdot P(t)}{1 + \frac{R_s}{R_d}(1 + j\omega R_d C_d)}$$

$$Z_{tot} = (M \cdot Z)_1 // (M \cdot Z)_2 // \ldots // (M \cdot Z)_K = \frac{M}{K} Z = \frac{M}{K} \left( \frac{R_d}{1 + j\omega R_d C_d} + R_s \right)$$

where the operator "∥" means "connecting in parallel", e.g., $Z_a \| Z_b = Z_a \cdot Z_b / (Z_a + Z_b)$. Applying the 2D photodiode matrix in the transimpedance amplifier scheme, it follows that $$Z_T = \frac{A \cdot Z_t}{1 + A + Z_t / \left[ \frac{M}{K} \left( \frac{R_d}{1 + j\omega R_d C_d} + R_s \right) \right]} \approx$$

$$\frac{A \cdot Z_t}{1 + A + j\omega \frac{K}{td} Z_t \cdot C_d} \text{ for } R_s \ll R_d \text{ and } R_d \gg 1$$

Hence the low-frequency receiver gain and the receiver's −3 dB bandwidth are, respectively, $$Z_T(\omega = 0) = \frac{A}{1 + A} \cdot Z_t$$

$$\omega_{-3dB} = \frac{M}{K} \frac{1 + A}{C_d \cdot Z_t}$$

Comparing with the single-photodiode receiver, the generated photocurrent is K times the current generated in each series of connected photodiodes; of each series, the current is equal to the average current generated in a single photodiode. The reference transimpedance $Z_{T,ref}$ therefore is $$Z_{T,ref}(\omega = 0) = K \cdot \frac{A}{1 + A} \cdot Z_t$$

Therefore the output signal generated by the receiver with the 2D matrix of N=M×K photodiodes (thus with a total photodetection area which is N times larger than that of a single photodiode) is for low frequencies K times larger than that of the receiver with a single photodiode, and the receiver's bandwidth is M/K times larger.

Figure 10:
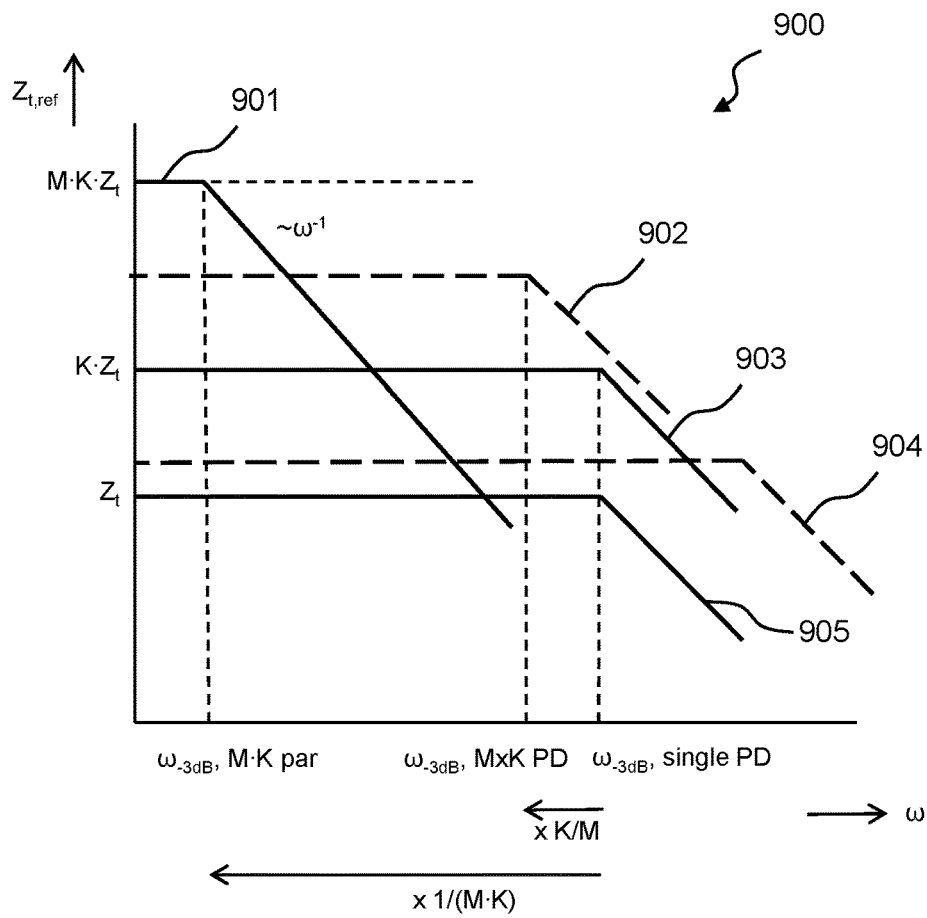
FIG. 10: shows frequency characteristics of OWC receiver (2D array of N=M×K photodiodes, followed by transimpedance amplifier).

In FIG. 10 it is shown how the frequency characteristics 901, 902, 903, 904 of the OWC receiver (consisting of the 2D array of N=M×K photodiodes) behave (where $Z_{T,ref} = V_{out}(t)/i_{PD}(t)$ expresses the ratio between the transimpedance amplifier's output voltage $v_{out}(t)$ and the average photocurrent generated per photodiode $i_{PD}(t) = \bar{a} \cdot R \cdot P(t)$). The characteristics are shown in FIG. 10 on a log-log scale, i.e. both the horizontal axis and the vertical axis have a logarithmic scale. As can be observed, when K=M, the bandwidth is the same as for a single photodiode (N=1).

With respect to a single photodiode 905: if the number of photodiodes N is constant, but K>M as shown by curve 902, then the bandwidth is smaller by a factor M/K, and the gain is a factor K larger. Reversely, when N is constant, but K<M, as shown by curve 904, the bandwidth increases but the gain decreases.

With respect to a single photodiode 905, by means of applying a 2D array of photodiodes with K=M as shown by curve 903 the active area for photodetection can be increased while the bandwidth stays the same and the output signal of the OWC receiver is increased. For K>M, i.e. curve 902, the output voltage is further increased and the bandwidth decreased with respect to the case K=M, i.e. curve 903; reversely, for K<M, i.e. curve 904, the output voltage is decreased and the bandwidth increased.

The present invention has now been described in accordance with several exemplary embodiments, which are intended to be illustrative in all aspects, rather than restrictive. Thus, the present invention is capable of many variations in detailed implementation, which may be derived from the description contained herein by a person ordinary skilled in the art. All such variations are considered to be within the scope and spirit of the present invention as defined by the following claims and their legal equivalents.

The invention claimed is:

1. An optical wireless communication (OWC) receiver configured to receive an incoming optical beam modulated with data and output an electrical output signal comprising the modulated data, the OWC receiver comprising:
   a lens configured to receive the incoming optical beam;
   a plurality of photodiodes positioned at a distance from the lens and positioned at or proximal to a focal plane of the lens, each of the plurality of photodiodes configured to receive a fraction of the incoming optical beam and generate a photocurrent in correspondence with photons received from the fraction of the incoming optical beam, wherein the plurality of photodiodes are arranged in a two-dimensional array comprising rows and columns, and wherein outputs of the columns are combined and their photocurrents are summed; and
   an amplifier connected to combined outputs of the columns of the two-dimensional array and configured to convert the summed photocurrents into an output signal of the amplifier;
   wherein interconnections of the photodiodes of the two-dimensional array are configured to form at least two parallel branches of photodiodes, and wherein each of the parallel branches comprises a cascade of at least two photodiodes forming a combined photodetector surface.

2. The OWC receiver according to claim 1, wherein the number of parallel branches of the two-dimensional array is greater than the number of cascaded photodiodes comprised in each of the branches.

3. The OWC receiver according to claim 1, wherein the number of parallel branches of the two-dimensional array is less than the number of cascaded photodiodes comprised in each of the branches.

4. The OWC receiver according to claim 1, wherein the number of parallel branches of the two-dimensional array equals the number of cascaded photodiodes comprised in each of the branches.

5. The OWC receiver according to claim 1, wherein the lens is configured to project the received optical beam onto a surface area that is larger than the combined surface area of the two-dimensional array of photodiodes.

6. The OWC receiver according to claim 1, wherein the two-dimensional array of the photodiodes comprising the rows and columns comprises interconnections of the photodiodes wherein respective interconnections defining each column are also interconnections defining the rows.

7. The OWC receiver according to claim 1, wherein each of the rows of the two-dimensional array further comprises a resistor positioned in parallel over the photodiodes of the respective row.

8. The OWC receiver according to claim 7, wherein each of the resistors is positioned outside of the two-dimensional array of the photodiodes.

9. The OWC receiver according to claim 7, wherein each of the resistors is integrated inside the two-dimensional array of the photodiodes.

10. An Optical Wireless Communication (OWC) system comprising at least one OWC receiver according to claim 1.

11. The OWC system according to claim 10 configured to provide optical communication via electromagnetic radiation with a wavelength in any one of the visible light spectrum, infrared light spectrum, near-infrared light spectrum or ultraviolet light spectrum.

12. The OWC system according to claim 10 configured for application in at least one of a wireless local area network, a wireless personal area network, and a vehicular network.

* * * * *